United States Patent
Geulen

[11] Patent Number: 5,999,825
[45] Date of Patent: Dec. 7, 1999

[54] USSD-SCHEDULER IN MSC

[75] Inventor: Eckhard Geulen, Kerkrade, Netherlands

[73] Assignee: Telefonaktiebolaget LM Ericsson, Stockholm, Sweden

[21] Appl. No.: 08/865,684

[22] Filed: May 30, 1997

[30] Foreign Application Priority Data

May 31, 1996 [DE] Germany .......................... 196 22 007

[51] Int. Cl.$^6$ ..................................................... H04M 3/42
[52] U.S. Cl. .......................... 455/560; 455/412; 455/414; 455/466; 379/201
[58] Field of Search ..................................... 455/412, 413, 455/414, 415, 416, 417, 466, 560, 433; 379/201–218

[56] References Cited

U.S. PATENT DOCUMENTS

| | | | |
|---|---|---|---|
| 5,579,372 | 11/1996 | Astrom | 455/433 |
| 5,627,888 | 5/1997 | Croughan-Peeren | 379/201 |
| 5,724,664 | 3/1998 | Lantto | 455/560 |

FOREIGN PATENT DOCUMENTS

| | | |
|---|---|---|
| 44 27 832 | 2/1996 | Germany . |
| 94/05124 | 3/1994 | WIPO . |
| 94/07338 | 3/1994 | WIPO . |
| WO 96/4742 | 2/1996 | WIPO . |
| WO 96/4743 | 2/1996 | WIPO . |

OTHER PUBLICATIONS

International Search Report, Nov. 8, 1993.
S. Collesei et al., "Short Message Service Based Applications in the GSM Network", IEEE/ICCC, pp. 939–943, Sep. 1994.
"European Telecommunication Standard prETS 300 625", dated Mar. 1994.
"European Telecommunication Standard prETS 300 572", dated Nov. 1994.
"European Telecommunication Standard prETS 300 549", dated Jan. 1996.
Office Action for German Application 196 22 007.6–31, dated Feb. 4, 1997.

*Primary Examiner*—Doris H. To
*Attorney, Agent, or Firm*—Burns, Doane, Swecker & Mathis, L.L.P.

[57] ABSTRACT

A mobile services switching center (MSC) for a digital cellular communication network is disclosed. The MSC comprises functionality for performing switching functions necessary to cover mobile stations (MSs) receiving services from the MSC and for monitoring the mobility of the MSs covered by the MSC. The MSC schedules unstructured supplementary service data dialogues to at least one virtual transaction channel between the MSC and a MS. Since several unstructured supplementary service data dialogues may be processed in parallel, unstructured supplementary service data requests will no longer be rejected during another unstructured supplementary service data dialogue, thus providing a very efficient approach with respect to throughput and reject ratio for unstructured supplementary service data dialogues.

23 Claims, 9 Drawing Sheets

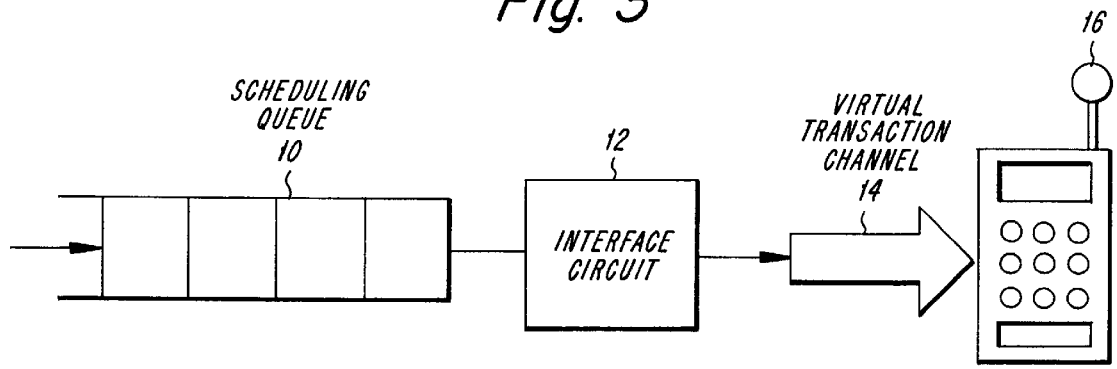
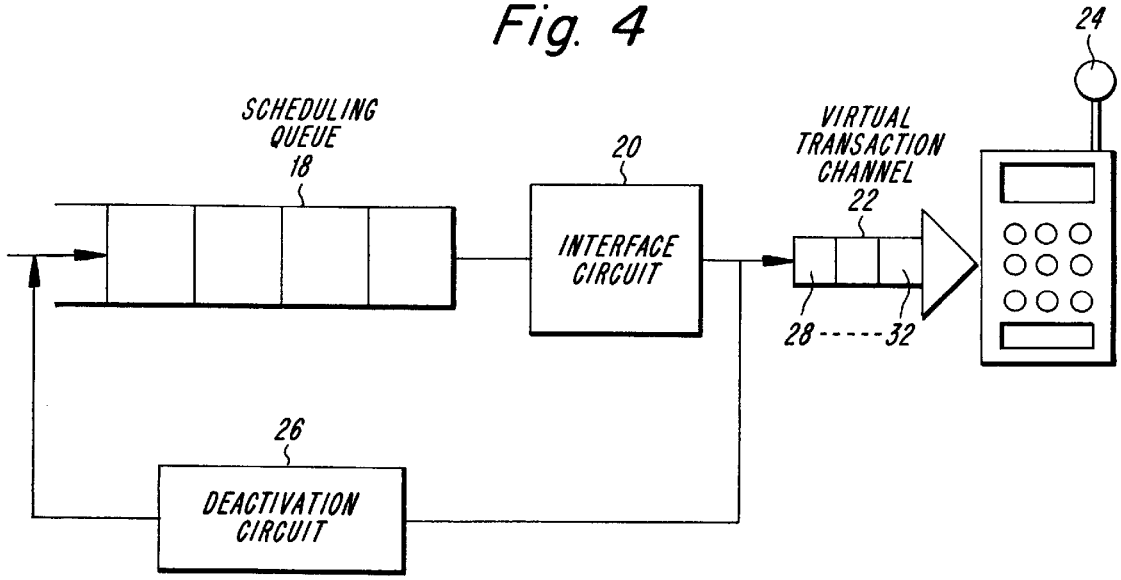

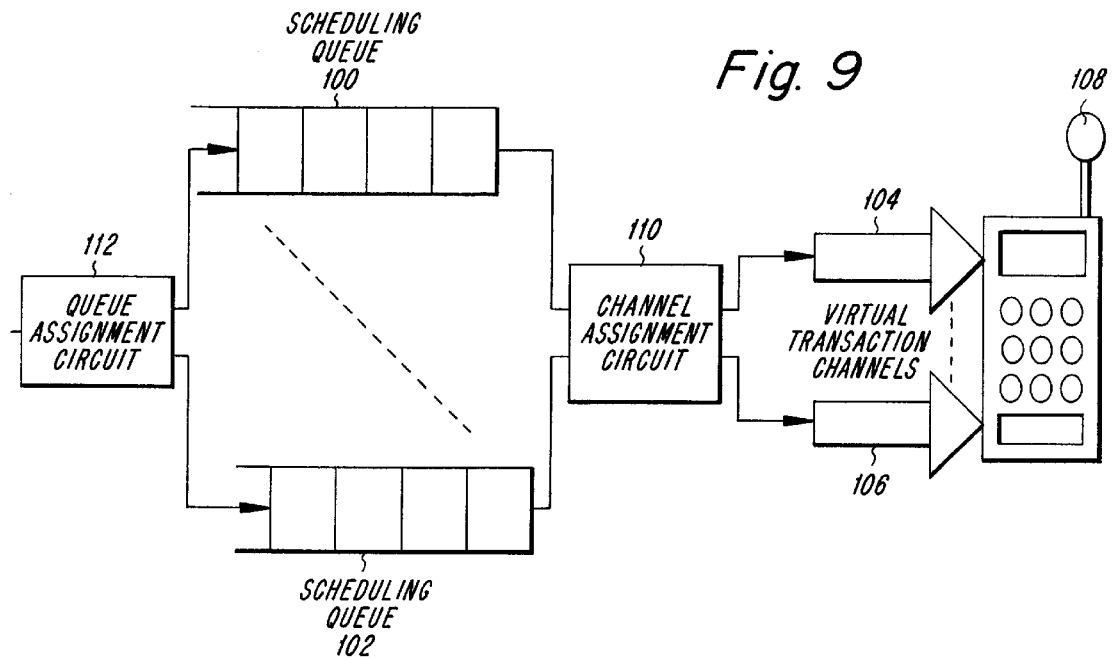
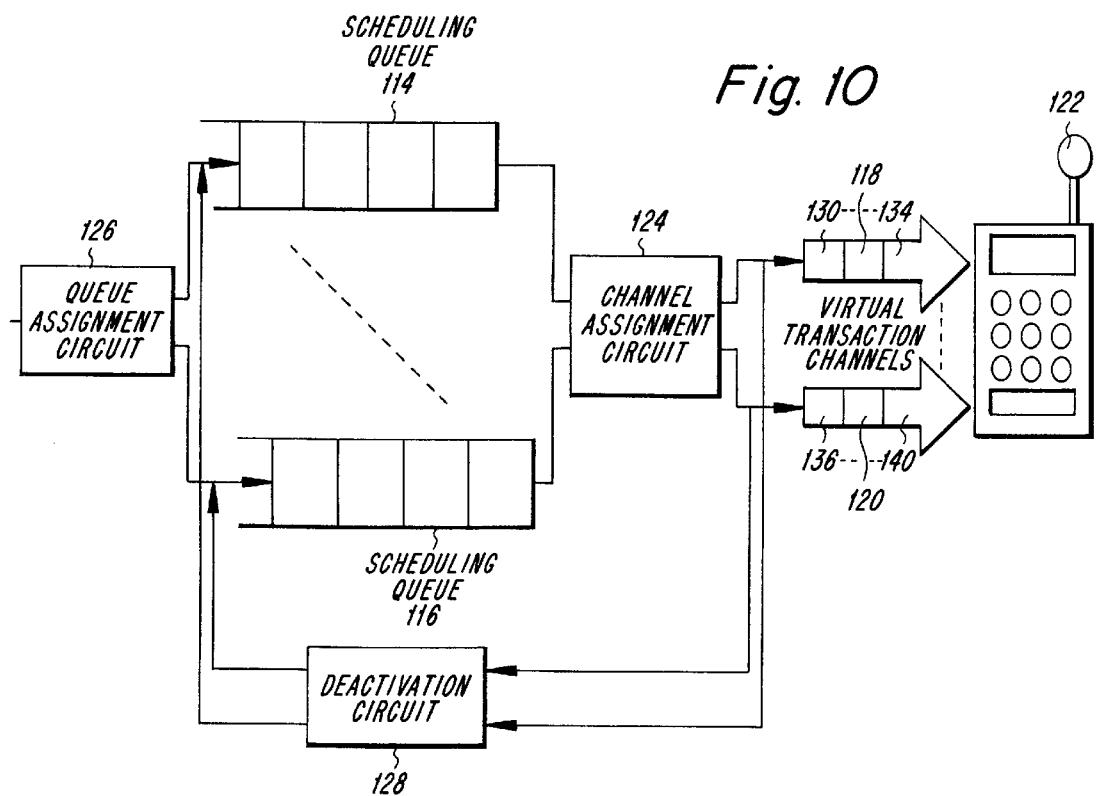

USSD-SCHEDULER IN MSC

TECHNICAL FIELD

The present invention relates to a scheduler for unstructured supplementary service data to be transferred in a digital cellular telecommunication system.

PROBLEM

Basic sub-systems for the architecture of such a digital cellular telecommunication system are a base station sub-system BSS, a network and switching sub-system NSS and an operational sub-system OSS. The base station sub-system BSS provides and manages transmission paths between mobile stations MS and the network and switching sub-system NSS. The network and switching sub-system NSS manages communications and connections to mobile stations MS. Neither the network and switching sub-system NSS nor the base station sub-system BSS are in direct contact with external networks, e.g. a public switched telephone network PSTN, an integrated services digital network ISDN, or a packet switched public data network PSPDN. While the mobile station MS, the base station sub-system BSS, and the network and switching sub-system NSS form the operational part of the digital cellular telecommunication system, the operational sub-system OSS provides means for a service provider for their control.

Therefore, in a digital cellular telecommunication system interaction between sub-systems can be grouped into two main parts, i.e. the operational part via the external networks to the network and switching sub-system NSS, the base station sub-system BSS, the mobile station MS to the user and the control part where the service provider directly accesses the operational sub-system OSS.

FIG. 13 shows components of the digital cellular telecommunication system being related to the network and switching sub-system NSS and the base station sub-system BSS and the mobile station MS, respectively. In particular, FIG. 13 shows two classes of networks, i.e. part of a fixed network such as a public switched telephone network PSTN like a national telephone network, an integrated services digital network ISDN or a packet switched public data network PSPDN and a public land mobile network PLMN like a global system for mobile communications GSM, a digital cellular system at 1800 MHz DCS 1800 or a personal communication system PCS. To link these networks there is provided a gateway mobile service switching centre GMSC that serves to determine specific locations of a mobile station MS in the digital cellular telecommunication system and to route calls towards this mobile station MS.

To this end, the gateway mobile service switching centre GMSC is connected to a functional unit called home location register HLR wherein two types of information are stored: subscriber information and mobile information to allow incoming calls to be routed to the mobile station MS. Any administrative action by the network operator with respect to mobile station data is carried out in the home location register HLR.

To route a call to a mobile station MS the gateway mobile service switching centre GMSC is also connected to a mobile service switching centre MSC through which the mobile station MS can obtain a service. The mobile service switching centre MSC performs the necessary switching functions required for mobile stations MS covered by this mobile service switching centre MSC. Also, the mobile service switching centre MSC monitors the mobility of its mobile stations MS and manages necessary resources required to handle and update the location registration procedures.

As can be seen from FIG. 13 the public land mobile network comprises a plurality of mobile service switching centers MSC each covering a predetermined number of basic cells covering an area wherein a mobile station MS can move. To this end, each mobile service switching centre MSC is connected to a visitor location register VLR that is linked to one mobile service switching centre MSC. The visitor location register VLR is a functional unit that dynamically stores mobile station information, such as location area in case the mobile station is located in the area covered by the visitor location register VLR. When a roaming mobile station MS enters an area assigned to a specific mobile service switching centre MSC the mobile service switching centre MSC informs the associated visitor location register VLR about the mobile station MS.

In addition, the base station sub-system BSS corresponds to physical equipment providing radio coverage to prescribed geographical areas known as cells and shown as hexagonal geographical regions in FIG. 13. Each base station sub-system BSS contains equipment required to communicate with the mobile station MS. Functionally, a base station sub-system BSS provides a control function carried out by a base station controller BSC and a transmitting function performed by the base transceiver system BTS. The base transceiver system BTS corresponds to a radio transmission equipment and covers each cell. A base station sub-system BSS can serve several cells because it can have multiple base transceiver systems BTS.

In the digital cellular telecommunication system there are three types of logical channels: traffic channel, control channel, and cell broadcast channel. The traffic channels are used to transmit user information like speech or data. The control channels are used to transmit control and signalling information. Finally, the cell broadcast channels are used to broadcast user information from a mobile services switching centre MSC to the mobile station MS listening in a given basic cell area. It is a unidirectional down link only point-to-multi-point channel used for a short information message service.

Using the architecture of the digital cellular telecommunication system outlined above, there may be provided a group of communication capabilities that the service provider offers to the subscribers. The basic telecommunication services provided in the GSM digital cellular telecommunication system are divided into three main groups: bearer services, teleservices, and supplementary services.

The bearer services give the mobile station MS the capacity required to transmit appropriate signals between certain user network interfaces such as data services, alternate speech/data, speech followed by data, clear 3.1 kHz audio service and support of automatic request for retransmission technique for improved error rates.

The teleservices provide the mobile station MS with necessary capabilities including terminal equipment functions to communicate with other mobile stations, e.g., short message services, video tech access, or message handling and storage services.

Finally, supplementary services modify or supplement basic telecommunication services and are provided with or in association with the basic telecommunication services. Such supplementary services comprise, e.g., number identification services, call offering services, call completion services, multi party services, or call restriction services.

Recently the specification relating to the digital cellular telecommunication system has been extended with respect to the supplementary services so as to include so-called unstructured supplementary service data USSD. The fact that by definition the roaming of a mobile station MS between GSM digital cellular telecommunication systems must be possible and that equipment of different vendors must be useable at the same time within one digital cellular telecommunication system implies that all supplementary services must be implemented according to the respective standards. Accordingly, it has not been possible to implement vendor specific services with trouble-free interoperability between networks and components.

To allow network operators to provide other supplementary services than those defined in the technical specifications, the unstructured supplementary service data USSD has been specified in ETSI Technical Specification 2.90, 3.90, and 4.90 as dedicated mechanism to exchange information between a mobile station MS and a network application provided in a digital cellular telecommunication system. Unstructured supplementary service data USSD generally provides a transparent link between a mobile station MS and a node application running in either of the mobile service switching centre MSC, the visitor location register VLR or the home location register HLR. Thus, the unstructured supplementary service data USSD allows a limited vendor specific implementation of unstandarized supplementary services.

As outlined above, either of the mobile services switching centre MSC, the visitor location register VLR or the home location register HLR can at any time set up an USSD-dialogue to a mobile station MS. This operation can either be a request for information from the mobile station MS or a notification requiring no information from the mobile station MS.

FIG. 14 shows the handling of network initiated USSD-dialogues. When an application in the home location register HLR is to send a USSD-request or notification to a mobile station MS it sets up a dialogue to the visitor location register VLR where the mobile station MS is currently registered and sends the operation to the visitor location register VLR from where it is relayed to the mobile station MS. It then waits on a response. The home location register HLR is responsible for controlling the dialogue and shall therefore release the dialogue when it receives a response from the visitor location register VLR. The home location register HLR may also release the transaction before receiving a response if necessary, e.g., if a dialogue timer expires. If during a dialogue the home location register HLR needs to send further information to the same mobile station MS it may either use this dialogue until all operations are completed or a different dialogue for a subsequent operation whereby the home location register HLR releases the first dialogue before starting the next. Therefore, as outlined above, using this approach no parallel USSD-dialogues may be set up at a time to a single mobile station MS.

Another case relates to an application where the VLR sends a USSD-request or notification to a mobile station MS and sets up a dialogue to the mobile services switching centre MSC where the mobile station MS is currently registered. Here, the visitor location register VLR sends the operation to the mobile services switching centre MSC and then awaits a response. The visitor location register VLR is responsible for controlling the application and therefore normally releases the application when it receives a response from the mobile services switching centre MSC. The visitor location register VLR also releases the transaction before receiving a response if necessary, e.g., if an application timer expires. If an application in the visitor location register VLR needs to send further operations to the same mobile station MS it may continue to use the same dialogue until all operations are completed. Another possibility is to use a different dialogue for a subsequent application where the visitor location register VLR releases the first dialogue before starting the next. As in the above-mentioned case, also with a dialogue invoked by the visitor location register VLR the dialogue is forwarded by the mobile services switching centre MSC.

The third case relates to an application where a mobile services switching centre MSC sends a USSD-request or notification to a mobile station MS. Such a MSC invoked USSD-dialogue is most likely to be used for call related operations where the application is controlling a call to or from the mobile station MS. The mobile services switching centre MSC is responsible for controlling the application and therefore normally releases the application when it receives a response from the mobile station MS. The mobile services switching centre MSC may also release the application before receiving a response if necessary, e.g., if an application timer expires. If an application in the mobile services switching centre MSC needs to send further information to the same mobile station MS as part of the same application it continues to use the same dialogue until all operations are completed. If a different application is to be used for a subsequent operation step the mobile services switching centre MSC releases a first dialogue before starting the next. If the mobile station MS releases the transaction at any time, e.g., due to a clearing, the mobile services switching centre MSC terminates the USSD-dialogue.

When the mobile station MS can handle the USSD-dialogue it processes the operation in multiple ways. For a USSD-request the mobile station MS displays the provided text and awaits the user's input if requested. To the contrary, in case the mobile station MS receives an USSD-dialogue while another USSD-dialogue or a non call related supplementary service transaction is in progress, the mobile station MS rejects the new dialogue. In addition, if the mobile station MS receives an USSD-dialogue in a state where the required interaction with the user of the mobile station MS is not possible, e.g., during dialing, it rejects the dialogue. Also, if the mobile station MS does not support the alphabet indicated in the USSD-dialogue it will inform the network node accordingly.

A problem with the USSD-dialogue described above is that node applications running on MSC, VLR or HLR and that spawn an USSD-dialogue towards the mobile station MS are neither synchronized among each other nor do they provide synchronization possibilities for the mobile station MS which also can spawn an USSD-dialogue. Therefore, it may happen that a second USSD-dialogue is requested while a first USSD-dialogue is already active.

Further, according to ETSI Technical Specification (ETS) 04.90 the mobile station MS does not allow an USSD-dialogue in parallel to any of the call independent supplementary services listed above. This means that two USSD-dialogues cannot exist in parallel since they are communicated as call independent supplementary services.

Another restriction leading to a similar disadvantage stems from the fact that some implementations of the mobile service switching centre MSC only support a single supplementary service transaction. Also, another limitation is that it is very difficult to present concurrent USSD-dialogues to the user without confusing him/her.

Therefore, the problem of the present invention is to provide a digital cellular telecommunication system wherein a plurality of USSD-dialogues can be transferred to a mobile station in parallel.

SOLUTION

According to the invention this problem is solved by mobile service switching centres having the features of claims 1, 7, 9, 11, 16 and scheduling methods according to claims 18 and 20.

According to the present invention the mobile service switching centre MSC is provided with a USSD-scheduler that receives network initiated USSD-requests, arranges them in an appropriate and intelligent manner, and transmits them, e.g., using only one transaction identifier and via a single supplementary service transaction channel. In case the USSD-scheduler in the mobile service switching centre MSC receives a second USSD-request while already processing a first one, it schedules this request and waits for the running USSD-dialogue to finish. In case the first USSD-dialogue does not terminate within a prespecified period of time the USSD-scheduler embeds the second USSD-dialogue into the first one. Thus, it uses a condition where the alternating sequence of network/mobile station messages allows the insertion of the second USSD-dialogue.

To inform the user of a mobile station MS of the start of the second USSD-dialogue the USSD-scheduler in the mobile service switching centre MSC inserts an appropriate message which is carefully chosen such that the user can follow the new dialogue structure.

Since several USSD-dialogues may be processed in parallel USSD-requests will no longer be rejected during another USSD-dialogue. Therefore, the invention provides a very efficient way to improve the characteristics of the digital cellular telecommunication system with respect to USSD-data throughput and reject ratio.

DRAWING DESCRIPTION

In the following detailed embodiments of the present invention will be described with reference to the enclosed drawing in which:

FIG. 3 shows a non-preemptive version of the USSD-scheduler with a single scheduling queue adapted for a single virtual transaction channel;

FIG. 4 shows a preemptive USSD-scheduler with one scheduling queue adapted for a single virtual transaction channel;

FIG. 9 shows a non-preemptive USSD-scheduler with a plurality of scheduling queues adapted for a plurality of virtual transaction channels;

FIG. 10 shows a preemptive USSD-scheduler with a plurality of scheduling queues for a plurality of virtual transaction channels;

DETAILED DESCRIPTION

Figure 1:
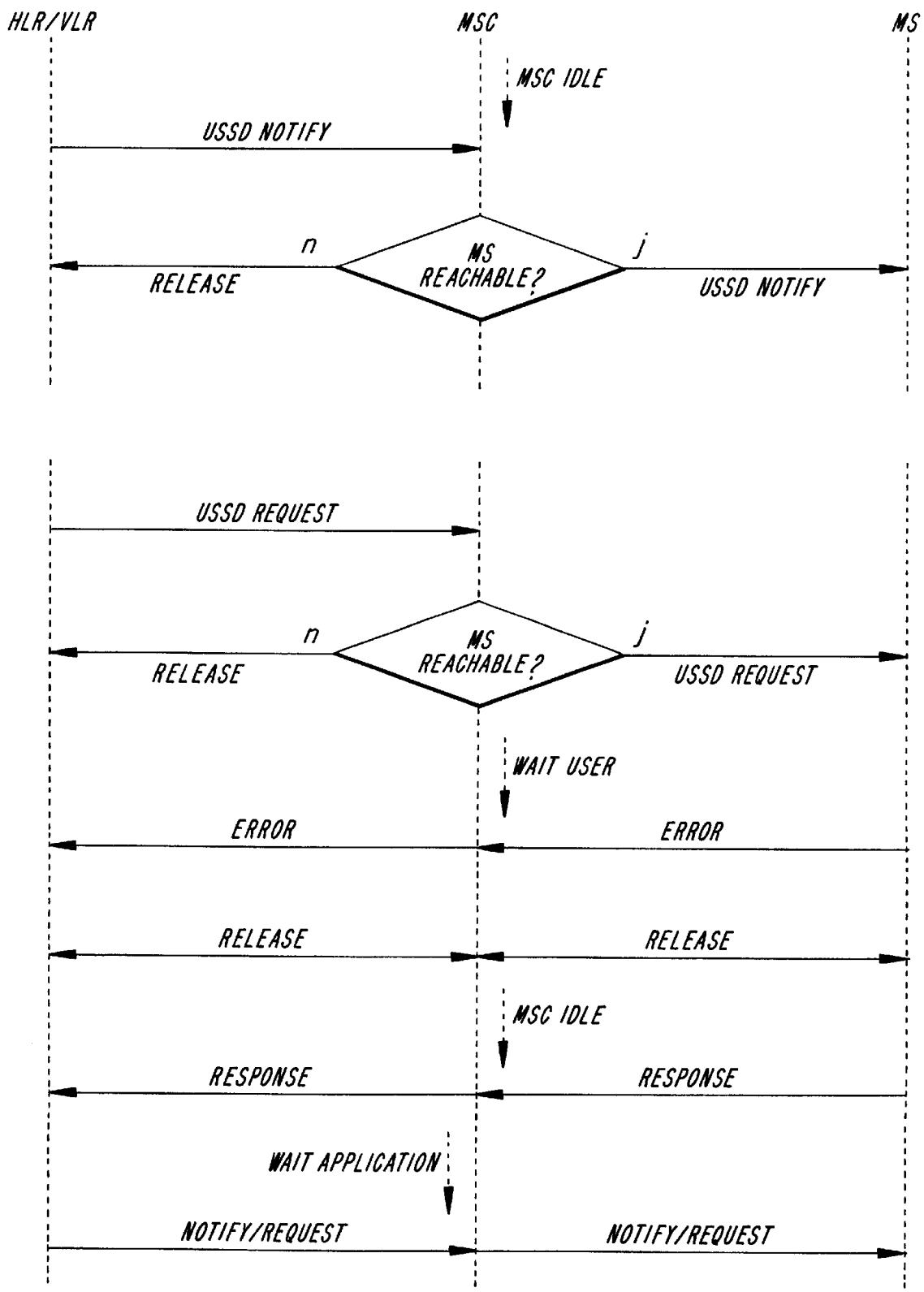
FIG. 1 shows examples for the handling of a single USSD-dialogue.

As outlined above, unstructured supplementary data operations can be initiated either by the mobile station MS or from the network side. The present invention is related to the second case for which a typical flow chart being related to typical USSD-dialogues is shown in FIG. 1 and to a case where a USSD-dialogue already exists and an additional USSD-dialogue is initiated on the network side. According to the invention a plurality of such USSD-dialogues is transferred to a mobile station MS at the same time, as will be described later.

FIG. 1 shows a node application in which a USSD-dialogue is either running on a home location register HLR or a visitor location register VLR and requires a USSD-notification or USSD-request. With a USSD-notification the mobile services switching centre MSC checks on whether the mobile station is reachable or not and then either transfers the USSD-notification to the mobile station or releases the USSD-dialogue with the home location register HLR or the visitor location register VLR. These steps are also carried out for a USSD-request. However, this situation is a little bit more complicated in that the user of the mobile station has to provide a response for the node application initiating the USSD-request. In case this is not possible an error message will be transferred to this node application. Also, a release can be initiated either by the node application or the mobile station to interrupt the USSD-dialogue. In case the user of the mobile station provides the required response after some time the node application may initiate further USSD-notification or -requests in reply thereto.

Every USSD-dialogue requires the provision of a transaction channel between the mobile services switching centre MSC and the mobile station MS. Since this transaction channel may be provided for independent of specific hardware features in the digital cellular telecommunication system and is based on the high level transfer protocols defined for such systems, for the purpose of this specification it will be referred to as virtual transaction channel. Further, in the following it will be assumed that the full capacity of such a virtual transaction channel may be divided into subunits referred to as transaction frames.

Figure 2:
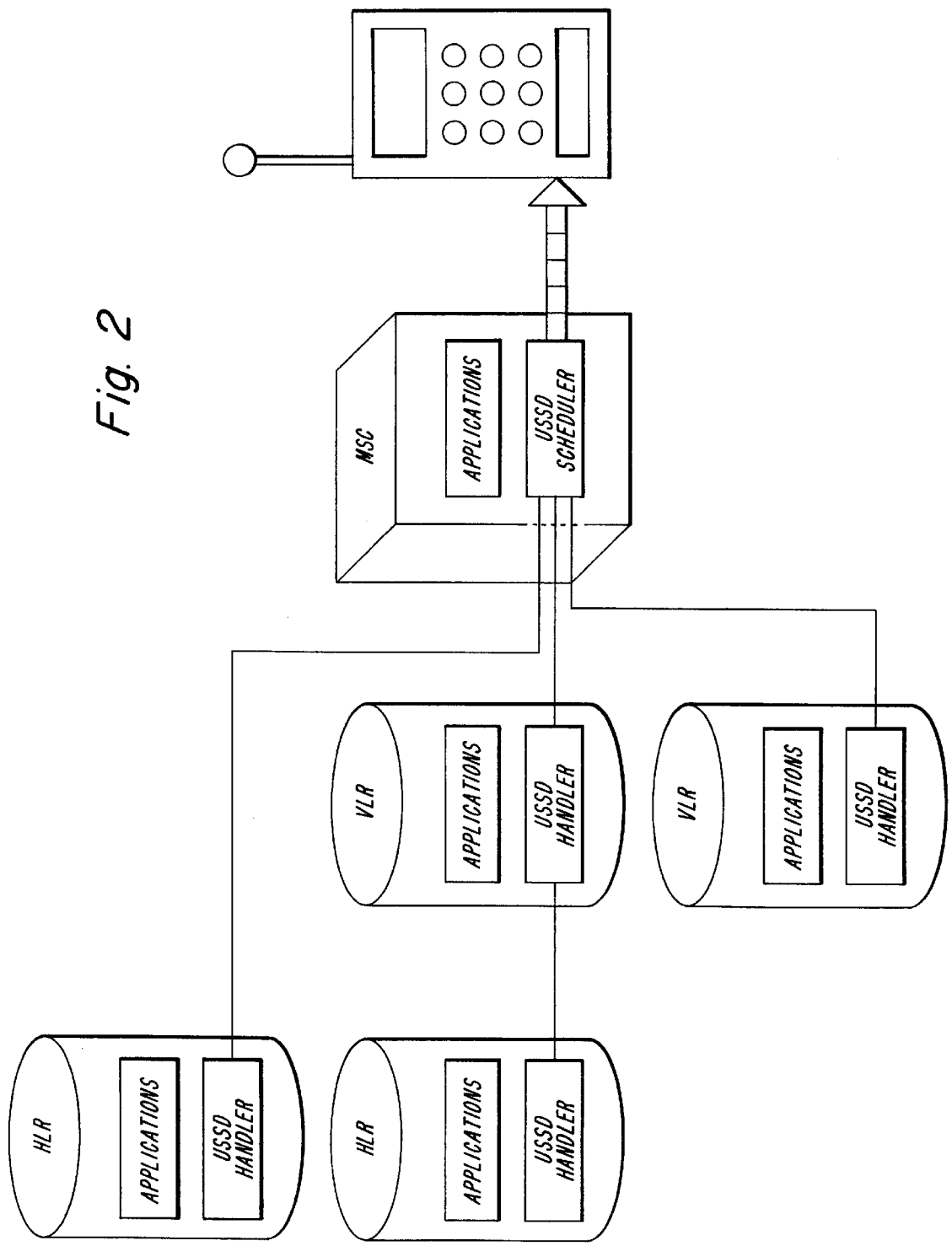
FIG. 2 shows the basic functionality of the USSD-scheduler according to the invention.
Figure 14:
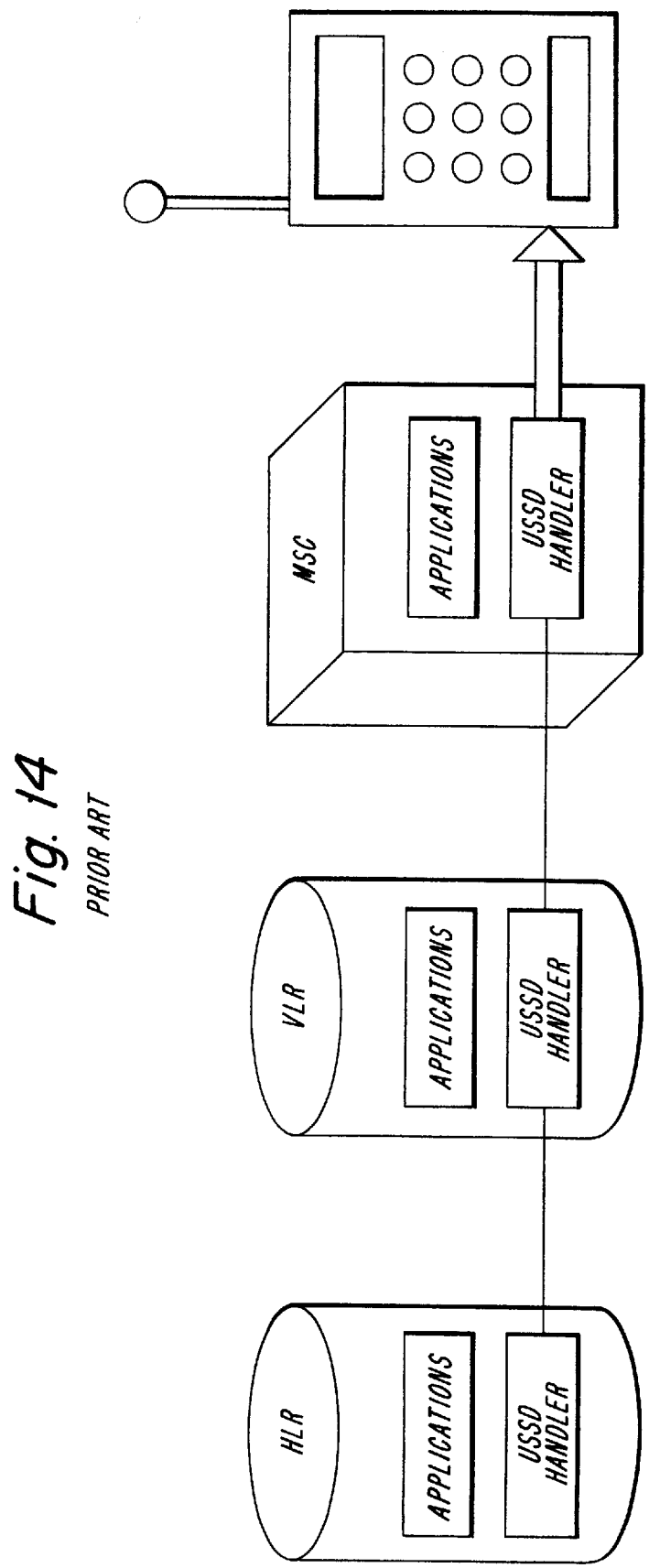
FIG. 14 shows the known handling of a USSD dialog.

FIG. 2 shows a basic principle underlying the different embodiments of the present invention. Contrary to the prior art mentioned above, according to the present invention a virtual transaction channel is used in a parallel way for the transfer of a plurality of USSD-dialogues initiated by different network applications in different home location registers HLR and visitor location registers VLR. According to the present invention this is achieved by providing a scheduling functionality within the mobile services switching centre MSC. Contrary to the usual approach outlined in FIG. 14 where the MSC only comprises a USSD-handler according to the present invention, the USSD-scheduler in the mobile services switching centre MSC allows to submit a plurality of USSD-dialogues in parallel way to the mobile station MS. The USSD-scheduler receives and coordinates these USSD-dialogues such that no error during the transfer to the mobile station and no confusion of the user thereof occur.

In the following, specific features of the USSD-scheduler will be explained with reference to FIGS. 3 to 12.

FIG. 3 shows a first basic configuration with one scheduling queue 10. Further, there is provided an interface circuit 12 to connect the scheduling queue 10 to a virtual transaction channel 14. This virtual transaction channel serves to supply USSD-dialogues to a mobile station 16.

As is shown in FIG. 3, according to this embodiment there is provided a USSD-scheduling in the mobile services switching centre that is based on a queuing model for different USSD-dialogues. In case the USSD-scheduler uses this queuing model it is possible to dynamically schedule incoming USSD-dialogues. The queued USSD-dialogues are then processed one after another whereby in case the USSD-dialogue is assigned to the virtual transaction channel 14 by the USSD-scheduler, the virtual transaction channel is not released before the full USSD-dialogue is finished. Therefore, this USSD-scheduler is of the non-preemptive type allowing no interruption of currently active USSD-dialogues.

The non-preemptive scheduling scheme allows to avoid collisions of different USSD-dialogues. Further, since only one USSD-dialogue at a time may be transferred via the virtual transaction channel 14 to a mobile station 16, any confusion of the user can surely be prevented.

FIG. 4 shows a second embodiment of the USSD-scheduler according to the invention. This USSD-scheduler comprises a scheduling queue 18 and an interface circuit 20 of the type outlined above. The interface circuit 20 connects the scheduling queue 18 to a virtual transaction channel 22 that is used to transfer the USSD-dialogue to a mobile station 24. Further, there is provided a deactivation circuit 26 that allows to interrupt a currently activated USSD-dialogue, e.g., upon expiring of a predetermined time period, and to reinsert this USSD-dialogue at the end of the scheduling queue 18. The USSD-scheduler shown in FIG. 4 is of the preemptive type since it allows to interrupt USSD-dialogues. As is shown in FIG. 4 this interruption leads to the provision of transaction frames 28 to 32 in the virtual transaction channel 22.

The preemptive USSD-scheduler shown in FIG. 4 provides increased flexibility in that during the execution of a USSD-dialogue on the virtual transaction channel 22, the interruption and subsequent resumption of USSD-dialogues is permitted. FIG. 4 also shows that each time a USSD-dialogue is selected for assignment to the virtual transaction channel 22 it is selected from the head of the scheduling queue 18 and allocated to a transaction frame. The duration of different transaction frames can be variably determined in accordance with USSD specific requirements. In case a USSD-dialogue terminates execution before the end of the transaction frame it departs from the virtual transaction channel 22. If at the end of the transaction frame the USSD-dialogue has not completed the deactivation circuit 26 assigns the USSD-dialogue to the end of the scheduling queue 18. According to the USSD-scheduler shown in FIG. 4 new USSD-dialogues join the end of the scheduling queue 18. Therefore, a USSD-dialogue handled by this USSD-scheduler can take a plurality of states such as the activated state, the terminated state, queued state, and deactivated state.

In general the preemptive USSD-scheduler shown in FIG. 4 generates USSD-schedules with increased flexibility when compared to those generated by the non-preemptive USSD-scheduler shown in FIG. 3. This improvement requires a certain administrative overhead consisting in the system processing and additional storage required to preserve the state of interrupted USSD-dialogues. This overhead usually is acceptable since it does not occur too frequently, thus not leading to a significant performance degradation for the USSD-dialogues.

Figure 5:
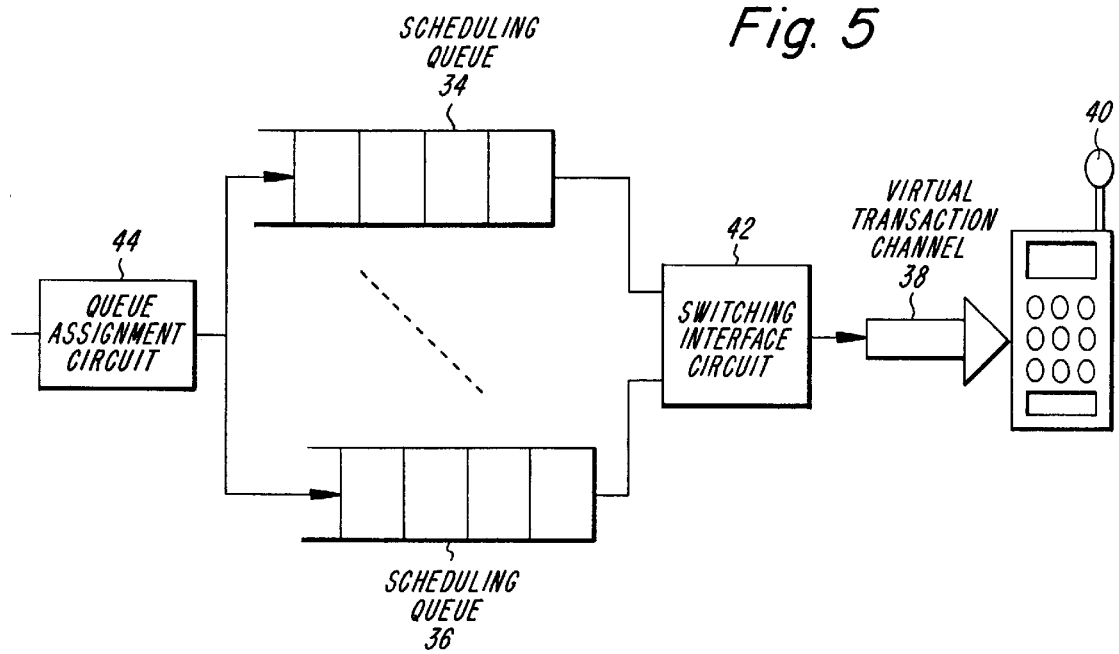
FIG. 5 shows a non-preemptive USSD-scheduler with a plurality of scheduling queues adapted for a single virtual transaction channel.

FIG. 5 shows a USSD-scheduler of the non-preemptive type comprising a plurality of scheduling queues 34 to 36. Each of these scheduling queues 34 to 36 is connected to a virtual transaction channel 38 used for a link to a mobile station 40 via a switching interface circuit 42. The USSD-dialogues received by the USSD-scheduler shown in FIG. 5 are assigned to the different scheduling queues 34 to 36 by a queue assignment circuit 44.

The non-preemptive USSD-scheduler shown in FIG. 5 is based on priority scheduling and groups a plurality of USSD-dialogues into priority classes. It is usually assumed that the lower the priority class number the higher the priority. That is, USSD-dialogues in priority class i are given preference over USSD-dialogues in priority class j in case i<j holds true. The switching interface circuit 42 gives preference to high priority USSD-dialogues, while simultaneously also guaranteeing the activation of lower priority USSD-dialogues.

The USSD-scheduler shown in FIG. 5 allows to achieve a scheduling where the capacity of the virtual transaction channel is optimally assigned to the different USSD-dialogues according to application defined priorities. It also allows to summarize different USSD-dialogues into different groups comprising related USSD-dialogues that may then be assigned to the virtual transaction channel with priority over other groups.

Figure 6:
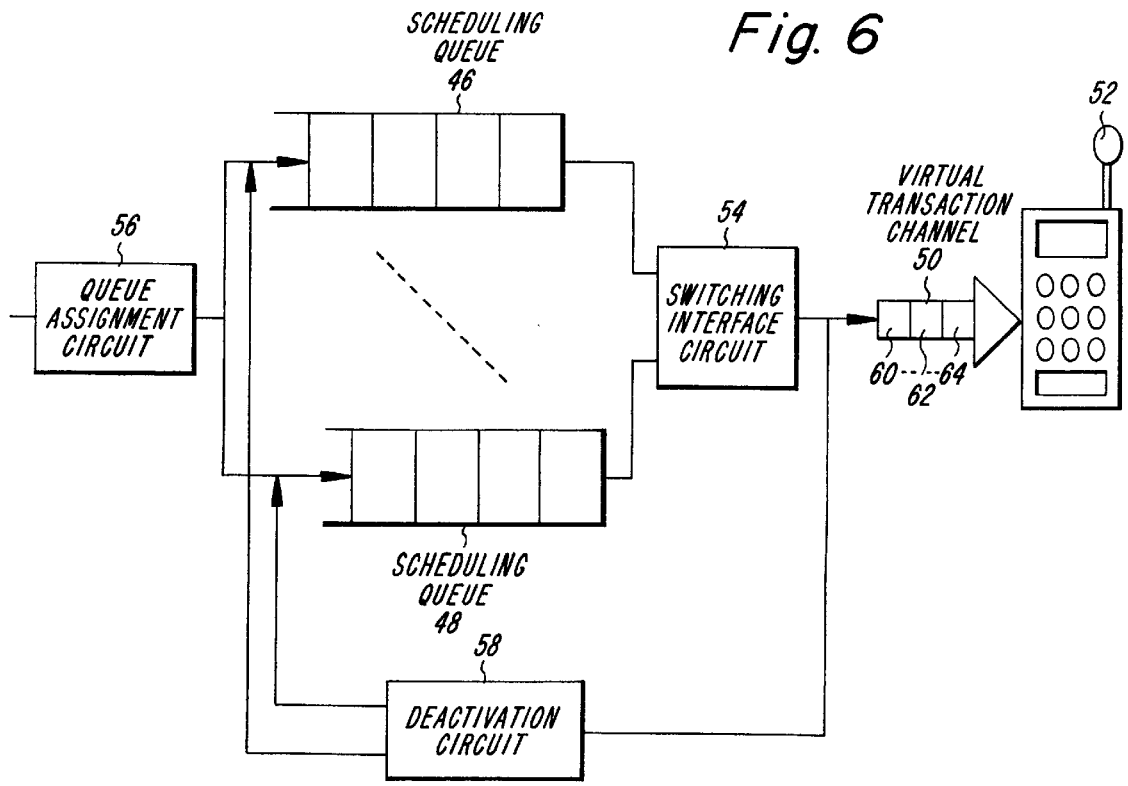
FIG. 6 shows a preemptive USSD-scheduler with a plurality of scheduling queues adapted for a single virtual transaction channel.

Further, FIG. 6 shows a preemptive version of a USSD-scheduler comprising a plurality of scheduling queues 46 to 48 connected to a virtual transaction channel 50 to a mobile station 52 via a switching interface circuit 54. As with the embodiment shown in FIG. 5 the USSD-scheduler of FIG. 6 comprises a queue assignment circuit 56 to assign the incoming USSD-dialogues to the scheduling queues 46 to 48. Further, there is provided a deactivation circuit 58 connected between the output of the switching interface circuit 54 and the inputs of the scheduling queues 46 to 48. The preemptive feature leads to the provision of transaction frames 60, 62 and 64 on the virtual transaction channel 50.

The USSD-scheduler shown in FIG. 6 combines the priority scheduling approach with the preemptive scheduling approach in a flexible manner. Here, the priority of a USSD-dialogue is not only evaluated by the queue assignment circuit 56, but also by the deactivation circuit 58 in case a USSD-dialogue is deactivated and assigned to the end of the corresponding scheduling queue. Thus, the USSD-scheduler shown in FIG. 6 combines the features of the USSD-schedulers shown in FIGS. 4 and 5 into a refined scheduling strategy.

While according to the above described embodiments USSD-schedulers are used with respect to only a single virtual transaction channel, the present invention also applies to multiple virtual transaction channels and therefore to multi parallel USSD-dialogues.

Figure 7:
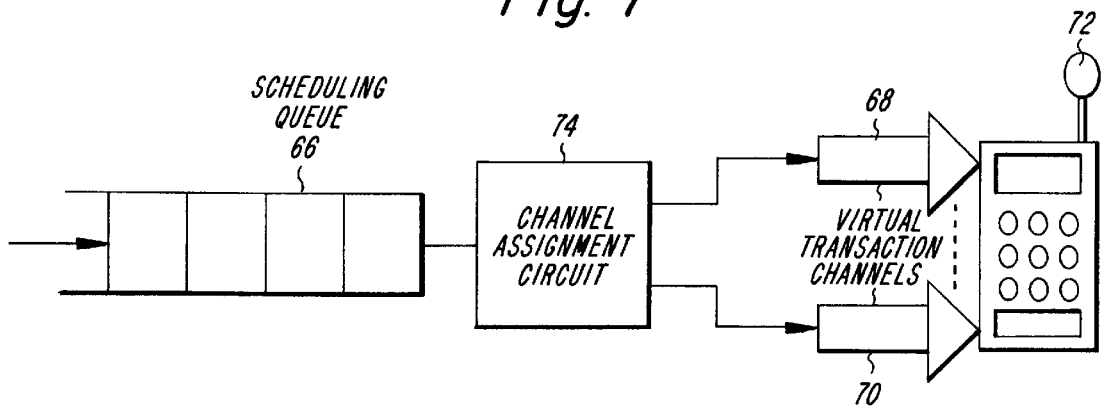
FIG. 7 shows a non-preemptive scheduler with one scheduling queue adapted for a plurality of virtual transaction channels.

FIG. 7 shows a first basic embodiment for such a multiple virtual transaction channel. Here, a single scheduling queue 66 is connected to several virtual transaction channels 68 to 70 supplying information to a mobile station 72 via a channel assignment circuit 74. The functionality of the channel assignment circuit 74 is to decide on which virtual transaction channel a USSD-dialogue queued in the scheduling queue 66 is actually assigned to.

The channel assignment circuit 74 assigns a USSD-dialogue to such a virtual transaction channel in which a USSD-dialogue is completed before all other active USSD-dialogues such that the considered virtual transaction channel is the earliest available. Besides this earliest assignment strategy another possibility is to await the time when all virtual transaction channels are available and then assign different USSD-dialogues randomly thereto. Both approaches rely on the assumption that the USSD-dialogues are received by the USSD-scheduler randomly and that no structural relationship, e.g. a synchronization therebetween, exists.

In this case the USSD-scheduler can be described by an effective model assuming that the P virtual transaction channels 68 to 70 are identical and that the single scheduling queue 66 is infinite. In case the mean processing time for USSD-dialogues on each virtual transaction channel 68 to 70 is $1/\mu$, the mean interarrival time of USSD-dialogues to the scheduling queue 66 is $1/\lambda$ and the service and interarrival times are exponentially distributed performance factors are derivable as follows when a first in first out serving strategy is applied in the USSD-scheduler. Defining a traffic intensity by $u=\lambda/\mu$ the utilization of the virtual transaction channels is $$\rho = \frac{u}{p}$$

Further, the mean response time for a USSD-dialogue is given by $$\overline{R}(\rho, u) = \frac{C(\rho, u)}{\mu p(1-\rho)} + \frac{1}{\mu}$$

where $C(\rho, u)$ is Erlang's C-formula and given by $$C(\rho, u) = \frac{u^p}{u^p + p!(1-\rho)\sum_{n=0}^{p-1}\frac{u^n}{n!}}$$

Figure 8:
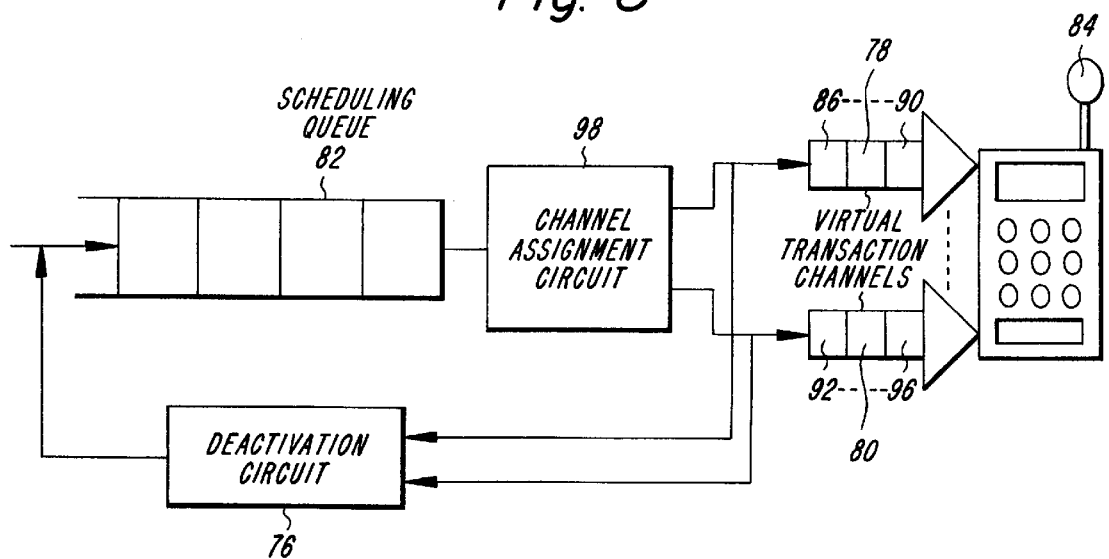
FIG. 8 shows a preemptive USSD-scheduler with a single scheduling queue adapted for a plurality of virtual transaction channels.

FIG. 8 shows a USSD-scheduler having a preemptive scheduling capability in case of multiple virtual transaction channels. Here, a deactivation circuit 76 having several inputs each being connected to a single virtual transaction channel 78 to 80 is connected to the end of a scheduling queue 82, so that USSD-dialogues that are transferred via the virtual transaction channels 78 to 80 to a mobile station 84 may be deactivated and inserted at the end of the scheduling queue 82 after the expiring of a prespecified time period. This leads to the generation of transaction frames 86 to 90 and 92 to 96 since a USSD-dialogue does not occupy a single virtual transaction channel until completed.

FIG. 9 shows a USSD-scheduler with combined priority scheduling and multiple channel assignment. Here, a plurality of scheduling queues 100 to 102 are connected to a plurality of virtual transaction channels 104 to 106 supplying USSD-dialogues to a mobile station 108 via a channel assignment circuit 110 that is connected to the scheduling queues 100 to 102 at its input terminals and connected to the virtual transaction channels 104 to 106 at its output terminals. In addition, there is provided a queue assignment circuit 112 to assign the incoming USSD-dialogues supplied by node applications to the scheduling queues 100 to 102 in accordance with the priorities assigned thereto.

Thus, the USSD-scheduler shown in FIG. 9 combines the functionality of the USSD-schedulers shown in FIG. 5 and FIG. 7, respectively. Overall, the transfer of USSD-dialogues grouped by priorities is optimized by achieving a maximum throughput over the plurality of virtual transaction channels 104 to 106.

FIG. 10 shows the most general form of a USSD-scheduler with a plurality of scheduling queues 114 to 116 and also a plurality of virtual transaction channels 118 to 120 used to supply USSD-dialogues to a mobile station 122. The plurality of scheduling queues 114 to 116 and the plurality of virtual transaction channels 118 to 120 are linked by a channel assignment circuit 124 that is connected at its input terminals to the scheduling queues 114 to 116 and that is connected at its output terminals to the plurality of virtual transaction channels 118 to 120. Incoming USSD-dialogues are assigned to the different scheduling queues 114 to 116 by a queue assignment circuit 126. Further, there is provided a deactivation circuit 128 having its input terminals connected to the plurality of virtual transaction channels 118 to 120 and having its output terminals connected to the end points of the scheduling queues 114 to 116.

As is shown in FIG. 10, through the provision of the deactivation circuit 128 each of the plurality of virtual transaction channels 118 to 120 is divided into a plurality of transaction frames 130 to 134 and 136 to 140. The reason for this is that in case of prespecified time periods for USSD-dialogues transferred via the virtual transaction channels 118 to 120 before the respective USSD-dialogues are completed these USSD-dialogues will be reassigned to the end of the corresponding scheduling queues 114 to 116 so as to enable the transfer of another USSD-dialogue via this virtual transaction channel.

It should be noted that the channel assignment circuit 124 is adapted to achieve a well balanced handling of USSD-dialogues having different priorities assigned thereto. In addition, the different transaction frames 130 to 134 and 136 to 140 of the different virtual transaction channels 118 to 120 can have different time periods so as to provide different transaction capacities for different USSD-dialogues.

One strategy for the realization of the channel assignment circuit 124 would be to always select the USSD-dialogue with lowest priority and assign this USSD-dialogue to the virtual transaction channel with earliest availability. Another possibility would be to always select the USSD-dialogue with lowest priority and to randomly assign this USSD-dialogue to the different virtual transaction channels. Further, to increase the balance for the handling of USSD-dialogues with different priorities it would also be possible to only select a prespecified number of USSD-dialogues with a certain priority and then step forward to USSD-dialogues with increased priorities before again selecting a USSD-dialogue with lowest priority. This strategy has the advantage that high priority USSD-dialogues will not be delayed too much so that better balance between the different priorities is achieved, as outlined above.

The USSD-schedulers explained with respect to FIGS. 3 to 10 not only allow to reduce the response time for USSD-dialogues to achieve a high transaction, but also to maximize the flexibility of USSD-dialogue handling by completing the USSD-scheduling in order of priority.

The USSD-schedulers shown in FIGS. 3 to 10 relate to cases where USSD-dialogues are received fully randomly by the USSD-schedulers. In the following there will be considered a case where predetermined relationships exist between different USSD-dialogues. One example for such a case would be that dependencies between different USSD-dialogues exist and that a specific USSD-dialogue must be completed before a USSD-dialogue being dependent therefrom may be transferred.

Usually many USSD-dialogues can be candidates for an assignment to multiple virtual transaction channels, and in case dependencies between USSD-dialogues exist, it is necessary to represent the collection of USSD-dialogues—which in the following is referred to as USSD-job—in a manner which conveniently represents these relationships.

Figure 11:
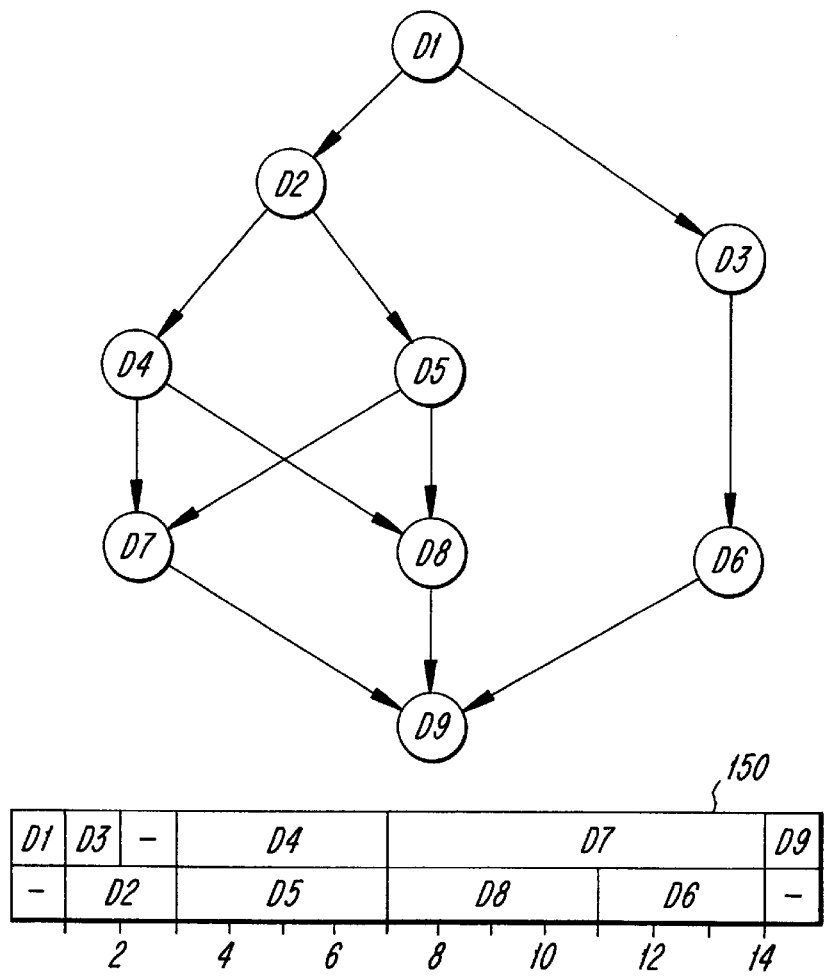
FIG. 11 shows the modeling of interrelationships between a plurality of USSD-dialogues with a directed acyclic graph and a scheduler therefore.

A USSD-job consists of a set of USSD-dialogues represented as precedence graph as is shown in FIG. 11. The nodes of the graph represent USSD-dialogues which are related together, e.g., in time. The edges between the different nodes imply that a partial ordering or precedence relation exists between the USSD-dialogues. Therefore, if $D_i < D_j$, USSD-dialogue $D_i$ must be assigned to a virtual transaction channel 146 to 148 before USSD-dialogue $D_j$ is assigned. USSD-dialogues having no predecessors are called initial USSD-dialogues and those with no successors are called final USSD-dialogues. Further, the duration of each USSD-dialogue can either be described by a fixed time period if this is available or otherwise by random variable describing variations of the individual USSD-dialogues.

Figure 12:
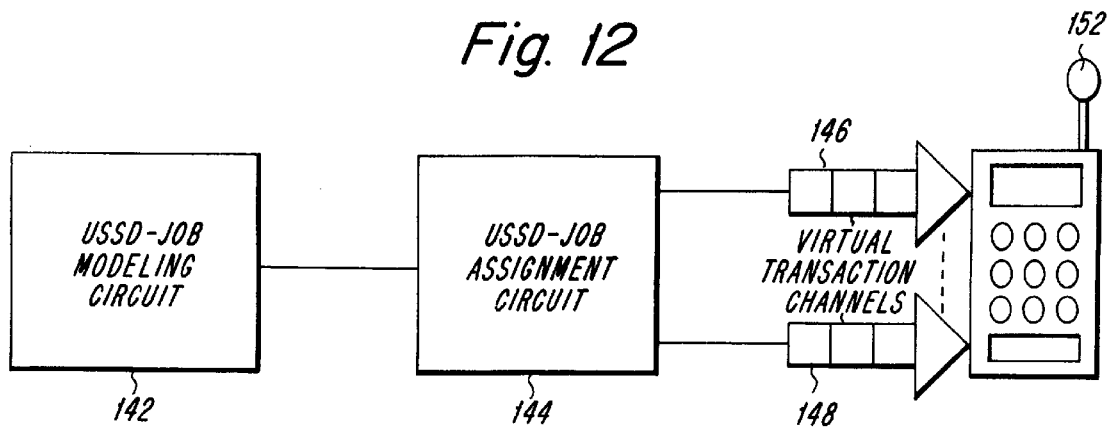
FIG. 12 shows the structure of a USSD-scheduler for a plurality of USSD-dialogue having an interrelationship, e.g., as outlined in FIG. 11.
Figure 13:
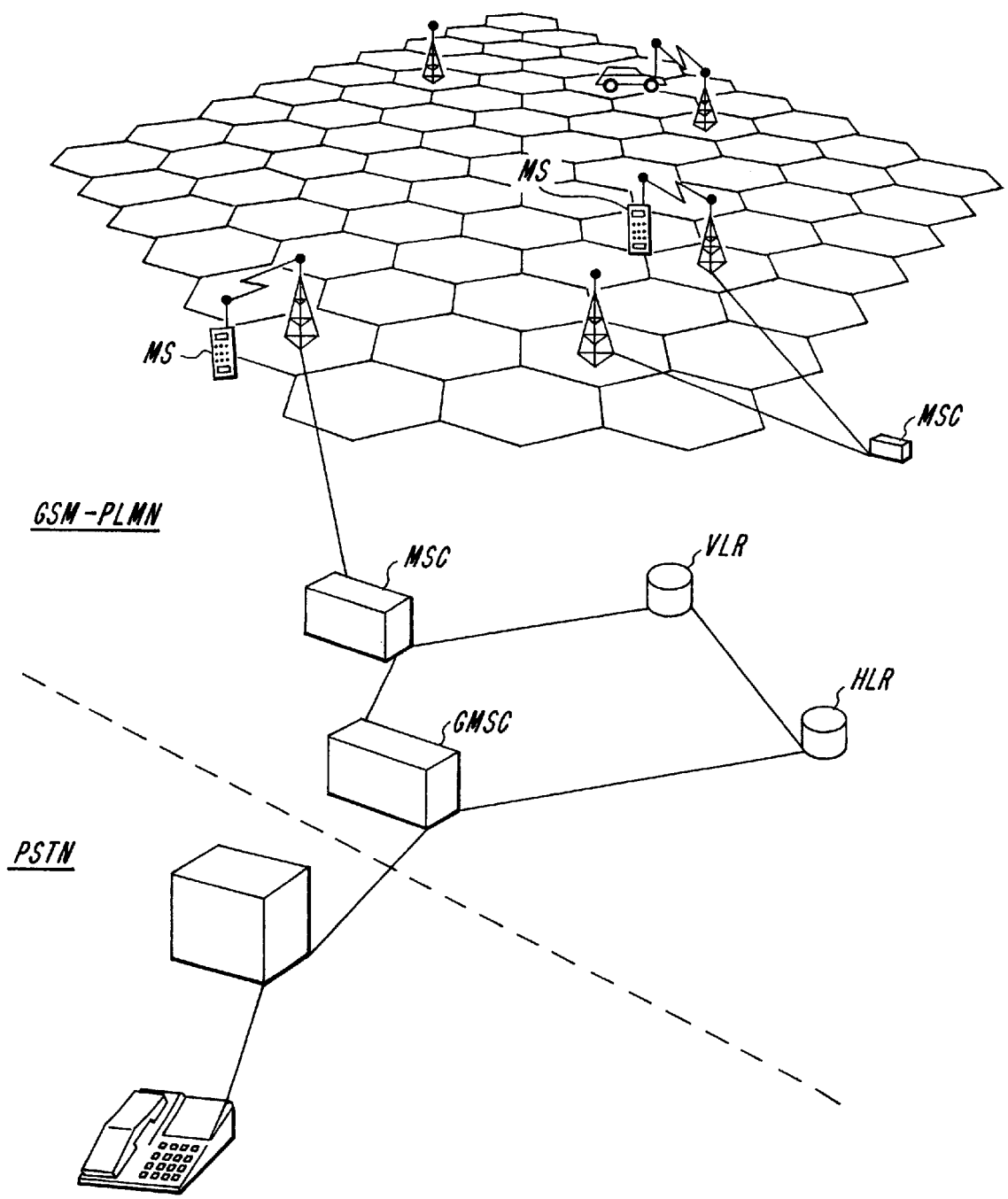
FIG. 13 shows an overview on the architecture of the digital cellular telecommunication system.

The USSD-scheduler for this case is shown in FIG. 12 and comprises a USSD-job modeling circuit 142 setting up the graph representation for the relationship between the different USSD-dialogues and a USSD-job assignment circuit 144 being connected thereto. The USSD-job assignment circuit 144 makes use of the structural information contained in the graph representation of the USSD-job to achieve an optimal assignment to the different virtual transaction channels 146 to 148.

The USSD-scheduler shown in FIG. 12 is operated as deterministic scheduler. One example of a schedule determined by the USSD-job assignment circuit 144 is shown in FIG. 11 and described by a so-called Gantt chart 150. For the particular case there are shown two virtual transaction channels 146 and 148 and the assignment of the individual USSD-dialogues D1 to D9 over the course of time. The USSD-Scheduler may also handle cases with only a single virtual transaction channel or more than two virtual transaction channels. Using this Gantt chart the transaction time for a USSD-scheduler is defined as the time until the last USSD-dialogue of the USSD-job has been transferred to a mobile station 152.

The USSD-job assignment circuit may be based on different strategies for the scheduling of the USSD-dialogues in a USSD-job. One possibility is to activate a schedulable USSD-dialogue as soon as possible, i.e. assign a USSD-dialogue according to the ordering defined in the directed graph to the next virtual transaction channel that is available. Another scheduling procedure is to carry out the assignment of USSD-dialogues to the virtual transaction channels 146, 148 in a manner which defers USSD-dialogue initiation to the latest possible time without increasing the minimum completion time. Such a USSD-schedule is called latest scheduling strategy contrary to the earliest scheduling strategy mentioned above. The latest scheduling strategy can be carried out using the directed graph describing the USSD-job by labeling this graph from the terminal node D9 to the initial node and then deriving the Gantt chart 150 in reverse order in dependence of the labeling result.

Therefore, the USSD-job assignment circuit 144 differs over the previously mentioned USSD-schedulers in that it makes use of a deterministic relationship between USSD-dialogues and applies deterministic scheduling approaches leading to even better scheduling results, i.e. increased virtual transaction channel utilization, reduced completion time for the transaction of the USSD-job and minimization of the overall response time.

It is to be understood that the above description is only to describe preferred embodiments and that numerous other arrangements may be devised by one skilled in the art without departing from the scope of the invention. The invention is thus limited only by the appended claims.

| | |
|---|---|
| BSC | Base Station Control |
| BSS | Base Station Sub-system |
| BTS | Base Transceiver System |
| GMSC | Gateway Mobile Service Switching Centre |
| HLR | Home Location Register |
| HPLMN | Home Public Land Mobile Network |
| ISDN | Integrated Services Digital Network |
| MMI | Man Machine Interface |
| MS | Mobile Station |
| MSC | Mobile Services Switching Centre |
| NSS | Network and Switching Sub-system |
| OSS | operational Sub-system |
| PSPDN | Package Switched Public Data Network |
| PSTN | Public Switched Telephone Network |
| VLR | Visitor Location Register |

I claim:

1. A mobile services switching center for a digital cellular communication network comprising:

switching means to perform switching functions necessary to cover mobile stations receiving services from said mobile services switching center;

monitoring means to monitor the mobility of mobile stations covered by said mobile services switching center; and scheduling means for scheduling a plurality of received unstructured supplementary and further specific service data dialogues to at least one virtual transaction channel between said mobile services switching center and a mobile station, said scheduling means comprising at least one scheduling queuing means adapted to store unstructured supplementary service data dialogues in a receiving order such that there is provided a scheduling queue assignment means adapted to assign received unstructured supplementary service data dialogues to a plurality of scheduling queuing means on the basis of priorities assigned to the received unstructured supplementary service data dialogues.

2. The mobile services switching center of claim 1, further comprising an interface means adapted to transfer unstructured supplementary service data dialogues in said scheduling queuing means to said virtual transaction channel.

3. The mobile services switching center of claim 1, further comprising an unstructured supplementary service data job modeling means adapted to model an interrelationship between a plurality of unstructured supplementary service data dialogues with a directed graph and an unstructured supplementary service data job assignment means adapted to receive said directed graph from said unstructured supplementary service data job modeling means and adapted to assign said plurality of unstructured supplementary service data dialogues to at least one virtual transaction channel.

4. The mobile services switching center of claim 3, wherein said unstructured supplementary service data job assignment means is of a type having an earliest channel assignment strategy.

5. The mobile services switching center of claim 3, wherein said unstructured supplementary service data job assignment means is of a type having a latest channel assignment strategy.

6. The mobile services switching center of claim 5 wherein said unstructured supplementary service data job assignment means executes said latest channel assignment strategy by a backward labeling of the directed graph provided by said unstructured supplementary service data job modeling means.

7. A mobile services switching center for a digital cellular communication network, comprising:

switching means to perform switching functions necessary to cover mobile stations receiving services from said mobile services switching center;

monitoring means to monitor the mobility of mobile stations covered by said mobile services switching center;

scheduling means for scheduling a plurality of received unstructured supplementary and further specific service data dialogues to at least one virtual transaction channel between said mobile services switching center and a mobile station, said means for scheduling data dialogues comprising at least one scheduling queuing means adapted to store unstructured supplementary service data dialogues in the receiving order;

interface means adapted to transfer unstructured supplementary service data dialogues in said scheduling queuing means to said virtual transaction channel; and first deactivation means connected between said output of said interface means and said input of said scheduling queuing means adapted to deactivate an unstructured supplementary service data dialogue upon request.

8. The mobile services switching center of claim 7, further comprising a scheduling queue assignment means adapted to assign received unstructured supplementary service data dialogues to a plurality of scheduling queuing means on the basis of priorities assigned to said received unstructured supplementary service data dialogues.

9. A mobile services switching center for a digital cellular communication network, comprising:

switching means to perform switching functions necessary to cover mobile stations receiving services from said mobile services switching center;

monitoring means to monitor the mobility of said mobile stations covered by said mobile services switching center;

scheduling means for scheduling a plurality of received unstructured supplementary and further specific service data dialogues to at least one virtual transaction channel between said mobile services switching center and a mobile station, said means for scheduling data dialogues comprising at least one scheduling queuing means adapted to store unstructured supplementary service data dialogues in said receiving order;

a scheduling queue assignment means adapted to assign received unstructured supplementary service data dialogues to a plurality of scheduling queuing means on the basis of priorities assigned to said received unstructured supplementary service data dialogues; and an interface switching means adapted to connect at least two scheduling queuing means to a virtual transaction channel in accordance with priorities assigned to unstructured supplementary service data dialogues stored in said scheduling queuing means.

10. The mobile services switching center of claim 9, further comprising a second deactivation means connected between said interface switching means and said scheduling queuing means and adapted to assign an activated unstructured supplementary service data dialogue to a scheduling queuing means upon request.

11. A mobile services switching center for a digital cellular communication network, comprising:

switching means to perform switching functions necessary to cover mobile stations receiving services from said mobile services switching center;

monitoring means to monitor the mobility of said mobile stations covered by the mobile services switching center;

scheduling means for scheduling a plurality of received unstructured supplementary and further specific service data dialogues to at least one virtual transaction channel between said mobile services switching center and a mobile station, said means for scheduling data dialogues comprising at least one scheduling queuing means adapted to store unstructured supplementary service data dialogues in said receiving order; and a first channel assignment means adapted to connect a scheduling queuing means to at least two virtual transaction channels.

12. The mobile services switching center of claim 11, further comprising a scheduling queue assignment means adapted to assign received unstructured supplementary service data dialogues to a plurality of scheduling queuing means on the basis of priorities assigned to said received unstructured supplementary service data dialogues.

13. The mobile services switching center of claim 11, wherein said channel assignment means is adapted to assign said unstructured supplementary service data dialogue at the head of said scheduling queuing means to an earliest available one of said virtual transaction channels.

14. The mobile services switching center of claim 11, wherein said channel assignment means is adapted to start assignment of unstructured supplementary service data dialogues to said virtual transaction channel only when said virtual transaction channel means is available.

15. The mobile services switching center of claim 11, further comprising a third deactivation means connected between said virtual transaction channel and said scheduling queuing means and being adapted to assign an activated unstructured supplementary service data dialogue to said input of said scheduling queuing means.

16. The mobile services switching center for a digital cellular communication network, comprising:

switching means to perform switching functions necessary to cover mobile stations receiving services from said mobile services switching center; and monitoring means to monitor the mobility of said mobile stations covered by said mobile services switching center;

scheduling means for scheduling a plurality of received unstructured supplementary and further specific service data dialogues to at least one virtual transaction channel between said mobile services switching center and a mobile station, said means for scheduling data dialogues comprising at least one scheduling queuing means adapted to store unstructured supplementary service data dialogues in said receiving order;

a scheduling queue assignment means adapted to assign received unstructured supplementary service data dialogues to a plurality of scheduling queuing means on the basis of priorities assigned to said received unstructured supplementary service data dialogues; and a second channel assignment means having its inputs connected to at least two scheduling queuing means and its outputs to at least two virtual transaction channels and being adapted to carry out said assignment on the basis of priorities of unstructured supplementary service data dialogues in said scheduling queuing means and an availability of said virtual transaction channel.

17. The mobile services switching center of claim 16, further comprising a fourth deactivation means connected between said at least two virtual transaction channels and said scheduling queuing means and being adapted to reassign unstructured supplementary service data dialogues assigned to virtual transaction channels upon request to said scheduling queuing means.

18. A method for scheduling unstructured supplementary service data dialogues in a mobile services switching center of a digital cellular communication system, said method comprising the steps of:

setting up a virtual transaction channel between said mobile services switching center and a mobile station;

receiving at least two random unstructured supplementary service data dialogues and defining an ordering for said received unstructured supplementary service data dialogues;

determining an assignment for said unstructured supplementary service data dialogues to said virtual transaction channel in dependence on said ordering, wherein said ordering for said unstructured supplementary service data dialogues is determined using a queuing model storing the randomly received unstructured supplementary service data dialogues; and said priority of unstructured supplementary service data dialogues is evaluated and used as a basis to assign different unstructured supplementary service data dialogues to different scheduling queuing means.

19. The method of claim 18, wherein said unstructured supplementary service data dialogues are assigned to an earliest available virtual transaction channel.

20. A method for scheduling unstructured supplementary service data dialogues in a mobile services switching center of a digital cellular communication system, said method comprising the steps of:

setting up a virtual transaction channel between said mobile services switching center and a mobile station;

receiving at least two unstructured supplementary service data dialogues and defining an ordering for said data dialogues;

determining an assignment for said unstructured supplementary service data dialogues to said virtual transaction channel in dependence on an ordering determined by using a queuing model storing said randomly received unstructured supplementary service data dialogues, wherein said priority of unstructured supplementary service data dialogues is evaluated and used as a basis to assign different unstructured supplementary service data dialogues to different scheduling queuing means and unstructured supplementary service data dialogues are assigned to an earliest available virtual transaction channel, and unstructured supplementary service data dialogues being assigned to virtual transaction channels are deactivated and reassigned to corresponding scheduling queuing means (18; 46, 48; 82; 114, 116) upon request by a deactivation means.

21. The method of claim 20, wherein an interrelationship between said received unstructured supplementary service data dialogues is modeled by a direct graph in an unstructured supplementary service data job modeling means and then transferred to an unstructured supplementary service data job scheduling means carrying out an assignment of said unstructured supplementary service data dialogues to at least one virtual transaction channel on the basis of said directed graph.

22. The method of claim 21, wherein said assignment to said virtual transaction channel is carried out using an earliest assignment strategy.

23. The method of claim 21, wherein said assignment to said virtual transaction channel is carried out using a latest assignment strategy.

* * * * *